March 27, 1962 W. B. WESTCOTT, JR 3,027,123
BRAKE COMPENSATOR FOR TANDEM LANDING GEARS
Filed March 19, 1959 2 Sheets-Sheet 1

FIG. I

*INVENTOR.*
WILLIAM B. WESTCOTT, JR.
BY

*ATTORNEY*

INVENTOR.
WILLIAM B. WESTCOTT, JR
BY
ATTORNEY

United States Patent Office 3,027,123
Patented Mar. 27, 1962

3,027,123
BRAKE COMPENSATOR FOR TANDEM
LANDING GEARS
William B. Westcott, Jr., Cleveland Heights, Ohio, assignor to Cleveland Pneumatic Industries, Inc., Cleveland, Ohio, a corporation of Ohio
Filed Mar. 19, 1959, Ser. No. 800,595
10 Claims. (Cl. 244—111)

This invention relates generally to an aircraft landing gear of the truck type and more particularly to such a landing gear in combination with a control system which functions to compensate for brake reactions on the truck, provide truck positioning prior to landing and damping of truck pitching or porpoising movement.

a truck type landing gear in combination with a control

It is an important object of this invention to provide system which insures equal loading of all the wheels on the truck during the braking operation.

It is another important object of this invention to provide a truck type landing gear with a hydraulic system which compensates for the tendency of the front wheels to assume an excessive load during braking operation.

It is another object of this invention to provide a brake compensating hydraulic system for truck type landing gears which also functions to damp pitching or porpoising movement of the truck following the landing impacts.

It is another object of this invention to provide a brake compensating system for truck type landing gears which operates to positively position the truck prior to landing touchdown.

It is still another object of this invention to provide a control system for truck type landing gears which positions the truck prior to touchdown, damps truck porpoising, and compensates for brake reaction.

Further objects and advantages will appear from the following description and drawings, wherein.

The increased size of aircraft has required the extensive use of truck type landing gears which includes an axle beam with dual wheels at each end. In such truck landing gears, it is necessary to insure that all of the wheels will be equally loaded at all times. The application of brakes normally causes the axle beam to move downward at the front end and place the front wheels under excessive loads unless compensation is provided. In some cases, mechanical linkages are provided to transmit the brake torque reaction directly to the piston of the strut eliminating the tendency to shift the load to the front wheels. However, such structures add weight and complication to the landing gear. Most efficient operation also requires the positioning of the axle beam so that the rearward wheels contact the ground before the forward wheels so that the spinup of the rearward wheels is accomplished before the spinup of the forward wheels. Such an arrangement, where all of the wheels are not permitted to spin up at the same time, reduces the strains imparted to the landing gear upon initial touchdown but it does produce a difficulty known as axle beam pitching or porpoising. When the rearward wheels contact first, the axle beam rotates in a direction which causes the forward wheels to come into contact with the ground. This causes a loading of the front wheels and an unloading of the rearward wheels. Following this, there is a return pitch which causes an unloading of the forward wheels and a loading of the rearward wheels. This action, which is known as porpoising, can be minimized by providing damping to resist rotation of the axle beam relative to the strut. In a landing gear incorporating this invention, a single system is utilized to position the landing gear prior to touchdown, damp out the porpoising movement, and provide brake torque compensation to insure equal loading of all landing wheels.

Figure 1:
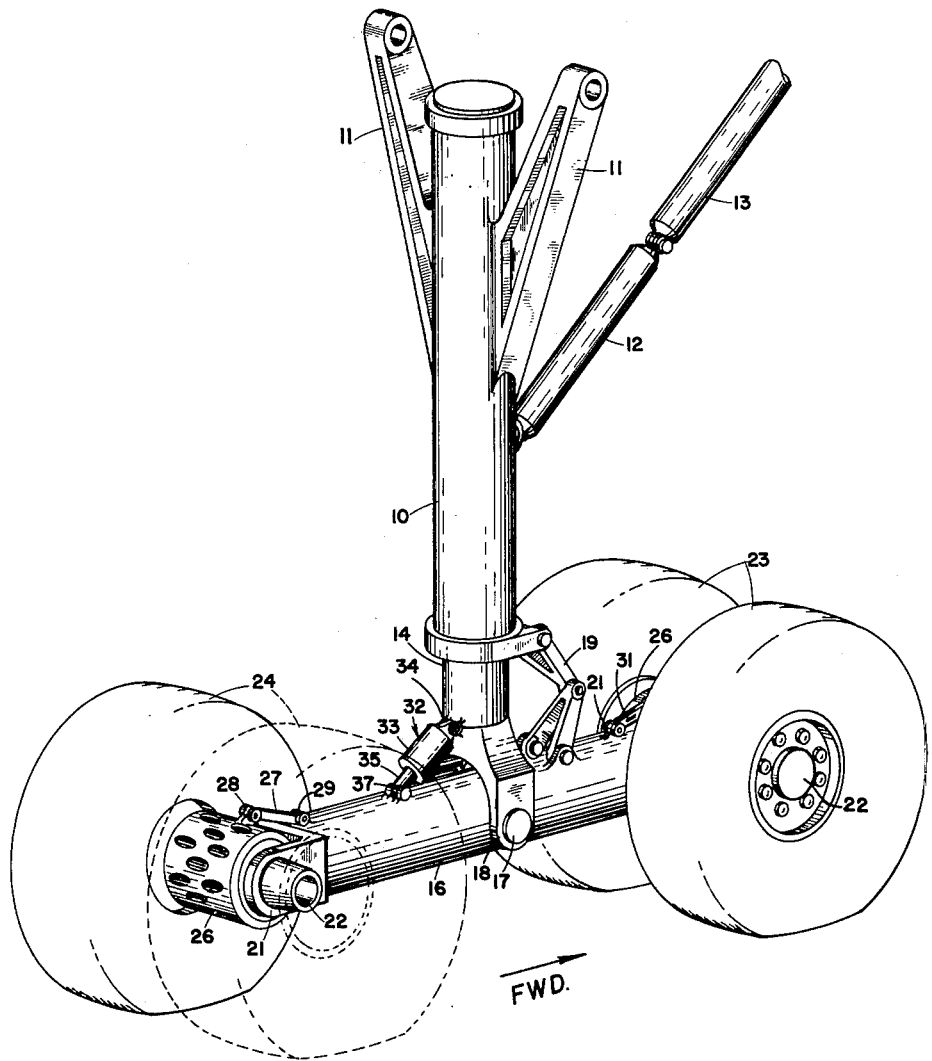
FIGURE 1 is a perspective view with parts removed for purposes of clarity illustrating a truck type landing gear incorporating this invention.

In FIGURE 1, a typical truck type landing gear is illustrated which includes a strut cylinder 10 provided with trunnion arms 11 adapted to be connected to the frame of an aircraft. A pair of folding drag links 12 and 13 are connected to the cylinder 10 to maintain the cylinder 10 in the vertical position. In normal practice, the landing gear is retractable by folding the drag links 12 and 13. The retraction mechanism forms no part of this invention so it has not been shown to simplify the understanding of the system. A strut piston 14 telescopes into the strut cylinder 10 and in co-operation therewith, provides the usual oleo to resiliently support the aircraft when it is on the ground. The oleo is arranged to urge the strut piston 14 downwardly relative to the strut cylinder 10 so that the oleo is compressed by the weight of the aircraft.

An axle beam 16 is connected by a pivot pin 17 to a fork 18 formed on the lower end of the piston 14. This connection permits the axle beam 16 to rotate around the axis of the pivot pin 17 relative to the strut piston 14. The usual torque arms 19 are connected between the strut cylinder 10 and the axle beam 16 on the forward side of the strut piston 14 to prevent rotation of the axle beam 16, and in turn the strut piston 14, around the central axis of the strut cylinder 10. The axle beam is formed with a fork mounting portion 21 at each of its ends through which extends a rotatable axle 22. A pair of forward dual wheels 23 are connected to the forward axle 22 and a similar pair of rearward dual wheels 24 are connected to the rearward axle 22. In FIGURE 1, one of the rearward wheels 24 has been removed for purposes of illustration but it should be understood that there is a rearward wheel mounted on each end of the rearward axle 22. Connected to each of the axles 22 within the associated forked portion 21 is a brake 26. The frame of the rearward brake is connected to a torque sensing link 27 by a pivot 28 and the torque sensing link is in turn connected at its other end to the axle beam 16 by a second pivot 29. The torque sensing link 27 functions to fix the brake against rotation relative to the axle beam 16 and provides an electrical signal as will be discussed in detail below. The rearward brake 26 is operable to resist rotation of the rearward axle 22 and in turn the rearward wheels 24. In most cases, the brakes 26 will be hydraulically operated disc types but since the particular brake structure forms no part of this invention, the details have not been shown and any brake suitable for aircraft use can be utilized. The forward brake 26 is anchored against rotation relative to the axle beam 16 by a link 31 so it functions in a manner similar to the rearward brake 26 to resist rotation of the forward wheels 23.

In order to provide the positioning, damping, and brake compensation of the axle beam, a hydraulic actuator damper 32 is connected between the piston 14 and the axle beam 16. The actuator 32 includes an actuator cylinder 33 connected by a pivot 34 to the strut piston 14 and an actuator piston 36 connected by a piston rod 35 and a pivot 37 to the axle beam 16. When an extending force is developed by the actuator 32 tending to move the actuator piston rod 35 out of the actuator cylinder 33, the forward end of the axle beam 16 is urged in an upward direction and the rearward end is urged in a downward direction.

Figure 2:
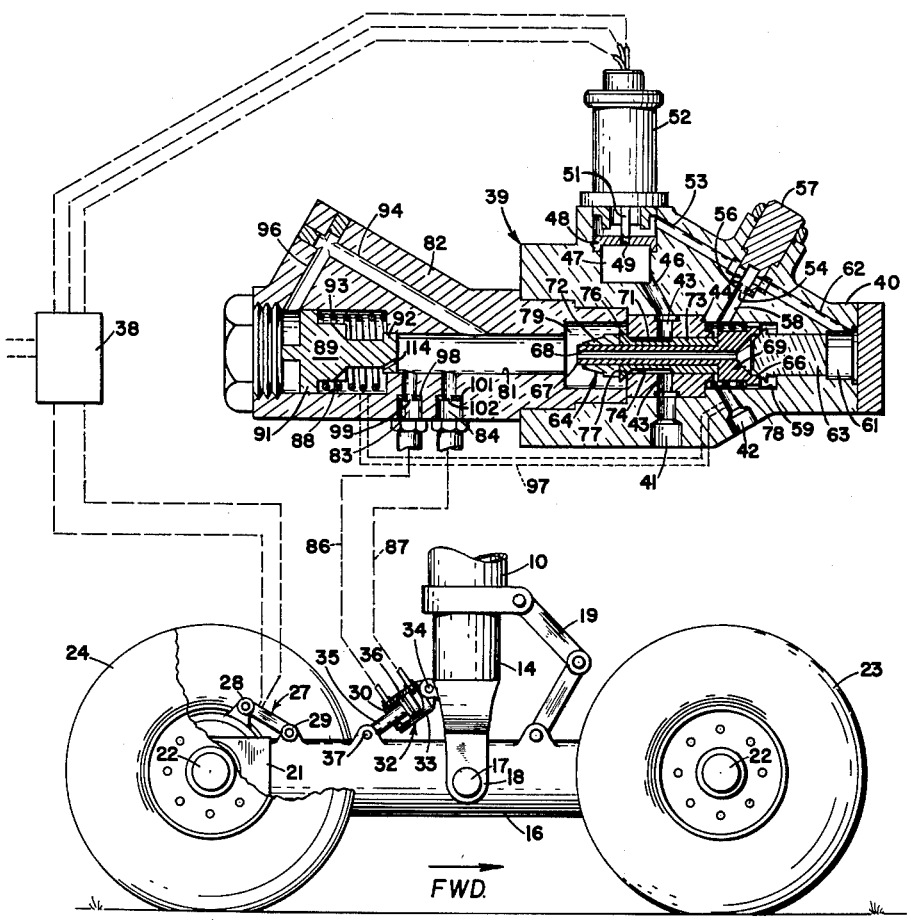
FIGURE 2 is a schematic illustration of the complete control system showing its connection to the landing gear.

To control the operation of the actuator 32, an electrohydraulic control system shown in FIGURE 2 is utilized. This system includes an amplifier 38 connected to an electrohydraulic servo valve 39. The body 40 of the servo valve 39 is formed with an inlet or pressure port 41 adapted to be connected to the aircraft hydraulic pressure system and by a return port 42 adapted to be connected to the reservoir return in the usual manner. Fluid under inlet pressure is supplied from the inlet port 41 through a cross port 43 in a valve block 44 and a diagonal passage 46 in the body 40 to a chamber 47. One side of the chamber 47 is defined by an orifice plate 48 formed with a central orifice 49. A metering poppet 51 is movable by an electric thrust motor 52 relative to the orifice 49 and operates to change the flow resistance therethrough. Connected to the upper side of the orifice plate 48 by a passage 53 is a fixed orifice 54. The fixed orifice 54 is formed in an orifice plate 56 secured in position within the valve by a threaded plug 57. The downstream side of the fixed orifice 54 is connected to the return port 42 by a passage 58 and a bore 59 in the body 40. Fluid under pressure enters the valve through the orifice 49 with a rate of flow which is determined by the position of the metering poppet 51. From there, the fluid passes through the fixed orifice 54 and out through the return port 42. The resistance to flow through the orifice 49 varies depending upon the position of the metering poppet 51 so the pressure in the passage 53 is determined by the relationship of the resistance to flow through the orifice 49 and the fixed orifice 54.

When the metering poppet 51 moves back from the orifice 49, a smaller pressure drop occurs through the orifice 49 and the pressure in the passage 53 approaches the pressure of the inlet. Conversely, if the metering poppet 51 moves down toward the orifice 49 and approaches a position wherein a flow therethrough is cut off, the pressure in the passage 53 will approach the pressure of the return port 42. The force motor 52 is designed to position the metering poppet 51 so that the pressure in the passage 53 is a direct function of the signal from the amplifier 38. When a large signal is applied to the torque motor 52, the poppet 51 assumes a position spaced from the orifice 49 and the pressure in the passage 53 approaches inlet pressure. Conversely, when a small signal is applied to the torque motor, the poppet 51 moves to a position close to the orifice 49 and the pressure in the passage 53 approaches return pressure.

The passage 53 is connected to a rearward chamber 61 formed in the valve body by a passage 62. A piston 63 is open on one end to the chamber 61 so it is urged to the left with a force which is a direct function of the pressure within the chamber 61. This force is transmitted to a valve slide assembly 64 by engagement between the piston 63 and a valve seat 66 formed in the right end of the valve slide assembly 64. The valve slide assembly includes a tubular core 67 formed with a through passage 68 and an enlarged head portion 69 in which the valve seat 66 is formed. The head portion 69 is guided in the bore 59 but does not provide a sealing engagement therewith so that both sides of the head within the bore 59 are at return pressure. A valve sleeve 71 is secured on the core 67 by a threaded fastener 72. The valve sleeve is formed with a rearward portion 73 which provides sealing engagement with a bore 74 and a head 76 which is adapted to engage a valve seat 77 at the open end of the bore 74. A spring 78 extends between the valve block 44 and the head portion 69 and urges the slide assembly 64 to the right normally maintaining the head 76 in engagement with the valve seat 77. However, when the pressure within the rearward chamber 61 produces a sufficient force on the piston 63 and valve slide assembly 64 to overcome the spring 78, the valve slide assembly 64 is moved to the left moving the head 76 away from the valve seat 77 permitting flow from the inlet port 44 to an output chamber 79. When the pressure within the output chamber 79 reaches a predetermined relationship to the signal applied to the thrust motor 52, the pressure reaction on the left-hand end of the valve slide assembly 64 urges the head 76 back into engagement with the valve seat 77. The spring 78 and the various proportions are arranged so that the pressure maintained in the output chamber 79 is a direct function of the electrical signal applied to the force motor 52. Therefore, when a small signal is applied to the force motor, a low pressure is maintained in the output chamber 79. Conversely, when the signal increases in magnitude, the pressure in the output chamber 79 increases in a corresponding manner.

The output chamber 79 is open to an axial bore 81 formed in an end member 82. The end member 82 is formed with two controlled ports 83 and 84 open to the axial bore 81 and in turn connected to the opposite ends of the actuator 32 by hydraulic lines schematically shown by the dotted lines 86 and 87 respectively. The left end of the end member 82 is formed with an enlarged bore 88 which opens to the axial bore 81 and is co-axial therewith. A shutoff valve 89 is formed wtih a head portion 91 extending into sealing engagement with the walls of the bore 88 and a valve section 92 engaging the walls of the bore 88. A spring 93 extends between the end member 82 and the shut-off valve 89 and normally maintains it in the left-hand position shown in FIGURE 2. A pair of passages 94 and 96 in the end member 82 connect the bore 81 with the bore 88 to the left of the head portion 91 so that the two sides of the shut-off valve 89 are open to the same pressure. Because the head portion 91 has a larger area than the valve section 92, the pressure in the two sides of the shut-off valve 89 produces a net force urging the shut-off valve to the right and operates, when a predetermined pressure is reached, to move the shut-off valve to an operated position wherein it isolates the control port 83 from the control port 84 and the output chamber 79. The portion of the bore 88 between the head portion 91 and the valve section 92 is connected to the return port 42 through a return passage 97 so the port 83 is connected to the return when the shut-off valve 89 moves to the operated position. In most cases, the return passage 97 is formed in the valve body and end member 82 in a plane other than the plane of the section shown in FIGURE 2. However, for purposes of illustration, it is shown as an external connection.

An orifice plate 98 formed with a central orifice 99 is positioned in the control port 83 and a similar orifice plate 101 formed with an orifice 102 is positioned in the control port 84. When the shut-off valve 89 is in the normal position shown, the two ends of the actuator 32 are connected together through damping orifices 99 and 102 to provide damping resisting movement of the piston 36.

Figure 3:
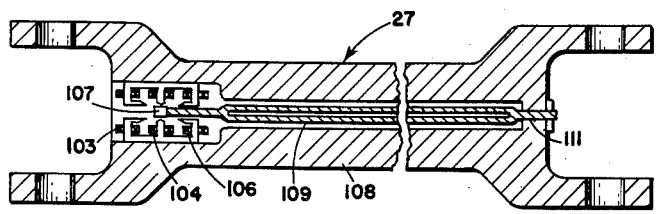
FIGURE 3 is an enlarged longitudinal section of a preferred sensing link which produces an electrical signal used to control the brake compensation operation of the control system.

The torque sensing link 27, shown in FIGURE 3, is provided with a transducer to develop an electrical signal which is a direct function of the stress applied to the link. This transducer has three coils 103, 104, and 106 in each of two opposite units. A.C. power is supplied from the aircraft power system to the central coils 104 and the end coils 103 and 106 are connected with their outputs bucking so that the combined output is zero when an armature 107 is centrally located in the transducer. If the armature 107 is moved either to the right or to the left, a change in reluctance occurs and a signal is developed by the differences in the outputs of the coils 103 and 106. This signal is developed by very small movements of the armature 107. The signal is transmitted to the amplifier 38 wherein it is amplified to usable values for controlling the thrust motor 52.

The sensing link 27 is provided with a long central portion 108 of substantially uniform cross section through which the braking torque is transmitted. The braking torque produces a strain in the central portion 108 which operates to move the armature 107 relative to the coils 103, 104, and 106. To obtain maximum armature movement, a long rod 109 is mounted on the link 27 at its right end 111. The armature 107 is mounted on the left end of the rod 109. Since the left end of the rod only supports the armature 107, it is not subjected to the strain applied to the central portion 108 so the entire strain in the central portion 108 appears as relative movement between the coils and the armature 107.

In operation prior to touchdown, the rearward end of the axle beam 16 should be lower than the forward end so that the rearward wheels 24 will engage the ground prior to the forward wheels 23. To insure this positioning, the poppet 51 is sized so that it doesn't completely close the orifice 49 and a predetermined minimum pressure is maintained in the output chamber 79 and in turn on both ends of the actuator 32. This pressure, which is equal in both ends of the actuator 32, acts on both sides of the piston 36. Because the left side of the piston 36, as viewed in FIGURE 2, has an effective area smaller than the right side due to the area of the piston rod 35, a net force is developed which urges the piston 36 to a fully extended position at which time the piston 36 engages the gland 30. Since the axle beam is symmetrical, a relatively small force will maintain the actuator in the extended position.

Upon impact of the rearward wheels 24 with the ground, the axle beam 16 rotates in a clockwise direction relative to the strut piston 14 causing the actuator piston 36 to move inwardly relative to the actuator cylinder 33. This action is very rapid and causes a displacement of oil within the actuator 32 by movement of the piston rod 35 into the actuator cylinder 33. Excessive pressures are prevented because the pressure is transmitted through the passage 68 in the valve slide assembly 64 and acts upon the left end of the piston 63 to move it away from the valve seat 66 when a predetermined maximum pressure is reached. The spring 78 is arranged so that this pressure relief does not occur in normal compensation or damping but only when the axle beam 16 rotates in a clockwise direction rapidly as during the touchdown of the aircraft. Therefore, as soon as the excessive pressure created by the rapid clockwise rotation of the axle beam 16 is relieved, the piston 63 reengages the valve seat 66. Any tendency of the axle beam 16 to porpoise immediately following the landing is resisted by the damping action of the flow of oil through the orifices 99 and 102. During the damping operation, there is a slight change in the volume of the actuator created by the movement of the piston 36 in and out of the actuator 33 which would cause an uncontrolled fluctuation in the output chamber 79 if the valve were not provided with steady flow. Therefore, the valve section 92 is preferably provided with a bleed port 114 so that regulation of the pressure in the output chamber will be maintained during the damping operation of the actuator.

As soon as the brakes are applied, a stress is developed in the sensing link 27 which produces a signal that is applied to the thrust motor 52 through the amplifier 38. This causes the pressure in the output chamber 79 to increase above the pressure necessary to shift the shut-off valve 89 to the right. As soon as the shut-off valve 89 is moved to the right, the lower end of the actuator 32 is connected to the reservoir return port 42 and only the right side of the piston 36 is subjected to the pressure produced by the servo valve 39. It should be noted that the high pressure which occurs at the time of landing touchdown is of a very short duration and does not shift the shut-off valve 89. The pressure developed by the servo valve 39 is applied to the upper side of the piston 36 and urges the rearward end of the axle beam downward with a force which is a function of the signal produced by the sensing link 27. Since the tendency for the axle beam to pitch forward is a function of the braking torque, this compensating force developed by the axle beam insures that all of the wheels will be equally loaded during the braking operation. In the illustrated embodiment, only the rearward link 27 is used to produce a signal for brake compensation since the braking of all four wheels is substantially equal. However, if necessary, the forward link 31 can be of the sensing type provided with a transducer. In such a structure, the signals from the two links would be summed in the amplifier 38. During the brake compensation phase of the operation, there is essentially no flow through the orifice 102 but merely changes in pressure to change the compensating force. Therefore, the damping orifice 102 does not impair the compensating operation.

In prior art landing gears, a spring damper is normally connected between the strut piston 14 and the axle beam 16 to position the axle beam before touchdown and resist porpoising. Such springs are similar to the actuator 32 in size and weight so the use of the actuator 32 does not increase the landing gear complexity or weight. The torque link 27 is normally required in the antiskid system so the amplifier and valve are the only added elements. Both the amplifier 38 and the servo valve 39 are lightweight so the brake compensating and axle beam damping functions are achieved without increasing the weight of the gear. In fact, substantial savings in weight are achieved because the mechanical linkage heretofore used to provide axle beam brake compensation is not required.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An aircraft landing gear comprising a vertically extending strut, a horizontally extending axle beam, a pivot connecting said beam intermediate its ends to said strut, wheels journalled on both ends of said beam, a brake on each end of said beam connected to the adjacent wheels and operable to produce a braking torque resisting rotation of said adjacent wheels, an actuator operably connected to said strut and beam operable in response to fluid under pressure to produce a compensating torque urging one end of said beam downward, signal producing means connected to at least one of said brakes to produce a signal having a magnitude proportional to the braking torque of said one brake, and control means connected to said actuator and operable in response to said signal to supply fluid to said actuator at a pressure that is proportional to said braking torque.

2. An aircraft landing gear comprising a vertically extending strut, a horizontally extending axle beam, a pivot connecting said beam intermediate its ends to said strut, wheels journalled on both ends of said beam, a brake on each end of said beam connected to the adjacent wheels and operable to produce a braking torque resisting rotation of said adjacent wheels, an actuator comprising co-operating cylinder and piston elements operably connected to said strut and beam movable in response to fluid under pressure to affect relative movement between said strut and beam, signal producing means connected to at least one of said brakes to produce a signal having magnitude proportional to the braking torque of said one brake, and control means connected to said actuator and operable in response to said signal to supply fluid to said actuator at a pressure that is proportional to said braking torque.

3. An aircraft landing gear comprising a strut, an axle beam, a pivot connecting said axle beam intermediate its ends to said strut, a wheel on each end of said axle beam, a brake on each end of said axle connected to the adjacent wheel and operable to produce a braking torque resisting rotation of said wheel, an actuator operably connected to said strut and axle beam including two elements co-operating to define two chambers the volumes of which are changed by relative movement between said elements, first valved means connected to at least one of said brakes operable to provide a minimum output pressure when said brakes are not operating and output pressure which is a function of said braking torque when said brakes are operated, and second valved means normally connecting said output pressure to both of said chambers through a flow restriction and operating in response to increases in output pressure above said minimum pressure to isolate one of said chambers from said output pressure.

4. An aircraft landing gear comprising a strut, an axle beam, a pivot connecting said axle beam intermediate its ends to said strut, a wheel on each end of said axle beam, a brake on each end of said axle connected to the adjacent wheel and operable to produce a braking torque resisting rotation of said wheel, an actuator operably connected to said strut and axle beam including two elements co-operating to define two chambers the volumes of which are changed by relative movement between said elements, first valved means connected to at least one of said brakes operable to provide a minimum output pressure when said brakes are not operating and output pressure which is a function of said braking torque when said brakes are operated, second valved means normally connecting said output pressure to both of said chambers through a flow restriction and operating in response to increases in output pressure above said minimum pressure to isolate only one of said chambers from said output pressure, and relief valved means connected to said output pressure preventing said output pressure from exceeding a predetermined maximum pressure.

5. An aircraft landing gear comprising a vertically extending strut, a horizontally extending axle beam, a pivot connecting said beam intermediate its ends to the lower end of said strut, wheels journalled on both ends of said beam, a brake on each end of said beam connected to the adjacent wheels and operable to produce a braking torque resisting rotation of said adjacent wheels, an actuator operably connected to said strut and axle beam operable in response to fluid under pressure to produce a compensating torque urging one end of said beam downward, signal producing means connected to at least one of said brakes to produce a signal having a magnitude proportional to the braking torque of said one brake, and fluid control means connected to said actuator and operable in response to said signal to supply fluid to said actuator at a regulated fluid pressure producing compensating torque the magnitude of which is a function of brake torque produced by said one brake.

6. An aircraft landing gear comprising a vertically extending strut, a horizontally extending axle beam, a pivot connecting said beam intermediate its ends to the lower end of said strut, wheels journalled on both ends of said beam, a brake on each end of said beam connected to the adjacent wheels and operable to produce a braking torque resisting rotation of said adjacent wheels, an actuator including two relatively movable elements, a connection between one element and said axle beam and the other element and said strut, said actuator being operable in response to fluid under pressure to produce a compensating torque urging one end of said beam downward, damping means connected to said actuator resisting relative movement between said elements, signal producing means connected to at least one of said brakes to produce a signal having a magnitude proportional to the braking torque of said one brake, and fluid control means connected to said actuator and operable in response to said signal to supply fluid to said actuator at a regulated fluid pressure producing compensating torque the value of which is a function of brake torque produced by said one brake.

7. An aircraft landing gear comprising a vertically extending strut, a horizontally extending axle beam, a pivot connecting said beam intermediate its ends to the lower end of said strut, wheels journalled on both ends of said beam, a brake on each end of said beam connected to the adjacent wheels and operable to produce a braking torque resisting rotation of said adjacent wheels, an actuator operably connected to said strut and beam operable in response to fluid under pressure to produce a compensating torque urging one end of said beam downward, a sensor connected to at least one of said brakes operable to produce an electrical signal which is a function of said braking torque, and an electrohydraulic valve operably connected to said sensor and said actuator maintaining regulated fluid pressure in said actuator producing compensating torque the value of which is a function of brake torque produced by said one brake.

8. An aircraft landing gear comprising a vertically extending strut, a horizontally extending axle beam, a pivot connecting said axle beam intermediate its ends to the lower end of said strut, landing wheels journalled on both ends of said axle beam adapted to support a load on said landing gear, brakes connected between said wheels and axle beam operable to produce torque resisting rotation of said wheels, a sensor connected to said brakes producing an electrical signal the magnitude of which is a function of the torque produced by said brakes, a hydraulic actuator including a first element connected to said strut and a second element connected to said axle beam operable in response to fluid under pressure to produce a torque urging one end of said axle beam downwardly relative to said strut, and valved means operably connected to said sensor and actuator operable to supply fluid to said actuator at a pressure which is function of the signal produced by said sensor.

9. An aircraft landing gear comprising a vertically extending strut, a horizontally extending axle beam, a pivot connecting said axle beam intermediate its ends to the lower end of said strut, landing wheels journalled on both ends of said axle beam adapted to support a load on said landing gear, brakes connected between said wheels and axle beam operable to produce torque resisting rotation of said wheels, a sensor connected to said brakes producing an electrical signal the magnitude of which is a constant function of the torque produced by said brakes, a hydraulic actuator including a first element connected to said strut and a second element connected to said axle beam operable in response to fluid under pressure to produce a torque urging one end of said axle beam downwardly relative to said strut, and valved means operably connected to said sensor and actuator operable to supply fluid to said actuator to a minimum pressure when said brakes are not operating and at a pressure which is a function of the signal produced by said sensor when said brakes operate.

10. An aircraft landing gear comprising a vertically extending strut, a horizontally extending axle beam, a pivot connecting said axle beam intermediate its ends to the lower end of said strut, landing wheels journalled on both ends of said axle beam adapted to support a load on said landing gear, brakes connected between said wheels and axle beam operable to produce torque resisting rotation of said wheels, a sensor connected to said brakes producing an electrical signal the magnitude of which is a constant function of the torque produced by said brakes, a hydraulic actuator including a first element connected to said strut and a second element connected to said axle beam operable in response to fluid under pressure to produce a torque urging one end of said axle beam downwardly relative to said strut, valved means operably connected to said sensor and actuator operable to supply fluid to said actuator at a minimum pressure when said brakes are not operating and at a pressure which is a function of the signal produced by said sensor when said brakes operate, and damping means connected to said actuator resisting movement between said element.

References Cited in the file of this patent

UNITED STATES PATENTS

| | | |
|---|---|---|
| 2,731,218 | Bonar | Jan. 17, 1956 |
| 2,792,998 | Dowty | May 21, 1957 |

FOREIGN PATENTS

| | | |
|---|---|---|
| 664,548 | Great Britain | Jan. 9, 1952 |